United States Patent [19]

Jenkins et al.

[11] Patent Number: 4,591,611

[45] Date of Patent: May 27, 1986

[54] IONOMERIC POLYMER COMPOSITIONS

[75] Inventors: Robert F. Jenkins, Wakefield; Bahram Siadat, Boxboro, both of Mass.

[73] Assignee: W. R. Grace & Co., Cambridge, Mass.

[21] Appl. No.: 652,399

[22] Filed: Sep. 20, 1984

[51] Int. Cl.[4] .......................... C08K 3/34; C08L 95/00
[52] U.S. Cl. ........................................ 524/64; 524/59; 524/62; 524/69; 524/70; 524/71; 524/399; 524/554; 428/489
[58] Field of Search .................... 524/59–72, 524/399, 554; 428/489, 491, 521

[56] References Cited

U.S. PATENT DOCUMENTS

| | | | |
|---|---|---|---|
| 2,581,295 | 1/1952 | Redfarn | 524/69 |
| 3,753,938 | 8/1973 | Edwards | 260/28.5 D |
| 3,926,884 | 12/1975 | McColgan | 524/71 |
| 3,932,326 | 1/1976 | Hoh et al. | 524/59 |
| 4,160,751 | 7/1979 | Bock et al. | 524/399 |
| 4,172,061 | 10/1979 | Bresson | 524/68 |
| 4,362,828 | 12/1982 | Agarwal et al. | 524/70 |
| 4,371,641 | 2/1983 | Boyer et al. | 524/70 |
| 4,376,179 | 3/1983 | Agarwal | 524/65 |
| 4,419,469 | 12/1983 | Bohm et al. | 524/68 |
| 4,420,524 | 12/1983 | Gorgati | 428/110 |
| 4,437,896 | 3/1984 | Partanen | 524/59 |
| 4,524,156 | 6/1985 | Cogliano | 521/83 |

OTHER PUBLICATIONS

American Gilsonite Co. Entitled "American Gilsonite, Properties & Applications" Copyrighted 1980.
American Gilsonite Company, Entitled: "American Gilsonite as a Filler-Extender for Thermoplastic Resins, copyrighted 1975.
"Gilsonite" in Kirk-Othmer: Encyclopedia of Chemical Technology, vol. 11, Third Edition, 1980.

*Primary Examiner*—Herbert J. Lilling
*Attorney, Agent, or Firm*—John J. Wasatonic; William L. Baker

[57] ABSTRACT

Ionomeric polymer compositions are provided which comprise an ionomeric polymer and about 5 to about 125 parts by weight of gilsonite, per 100 parts by weight of the ionomeric polymer. The inventive compositions can be formulated as processable materials which can be fabricated into articles such as sheets, tubes, and films having improved tear propagation resistance and fire retardance and decreased levels of water absorption.

25 Claims, No Drawings

IONOMERIC POLYMER COMPOSITIONS

BACKGROUND OF THE INVENTION

The present invention relates to novel ionomeric polymer compositions and more particularly to novel ionomeric polymer compositions which can be formed into sheets and films having improved physical properties.

A relatively new class of polymers are the ionically cross-linkable polymers, generally referred to herein as "ionomeric polymers" or "ionomers". These polymers contain ionic groups which are pendant to the polymer backbone and which aggregate with one another in the polymer matrix to effect physical cross-linking. The aggregation of the pendant ionic groups is believed to result in the formation of microphase-separated ionic domains which are distributed throughout the polymer matrix. At normal temperatures of use, the physical cross-linking results in properties normally attributed to thermoset polymers. However, at elevated temperatures the ionic aggregates dissociate, allowing the ionomer to become deformable in the same manner as thermoplastic polymers. The dissociation of the ionic aggregates can be aided considerably by the use of plasticizers which preferentially plasticize the ionic cross-link regions to cause relaxation of the ionic bonds. Such plasticization is taught, for example, in U.S. Pat. Nos. 3,847,854 and 3,870,841, both of which are incorporated herein by reference.

Certain physical properties of ionomeric polymers or, more specifically, of articles formed from ionomeric polymer compositions, can be modified by variations in the base polymer type, the concentration of ionic groups pendant to the base polymer, the type and level of metal salt used to effect cross-linking between ionic groups, and the type and level of preferential plasticizer. Physical properties such as tensile strength, modulus, hardness, and elongation may thus be modified or improved.

Notwithstanding that improvements in certain physical properties have been achieved, there has been a continuing need to further improve these physical properties and, moreover, to improve certain other physical properties of various ionomeric polymer compositions. With respect to the latter, one area of application that is of interest is the use of processable ionomeric polymer compositions to form relatively thin sheets, tubes, films, and the like. In certain processable compositions that are particularly well suited for the formation of these articles, e.g., extrudable sulfonated EPDM rubber compositions, certain physical properties, other than those specifically mentioned above, which would be highly desirable from the standpoint of the practical utility of such articles have not been satisfactorily provided. In particular, when these compositions have been formed into relatively thin sheets or films they have displayed relatively poor resistance to tear propagation, poor fire retardance, and a tendency to absorb undue amounts of water with a resultant adverse effect on the modulus of the sheet or film. Thus, there has been a need to provide new ionomeric polymer compositions which substantially overcome these deficiencies and which do so without adverse effect on the other important physical properties such as tensile strength and elongation at break. These new compositions should be thermoplastic and have suitable rheological properties to permit the ready fabrication of articles by extrusion or molding of the composition.

It is accordingly an object of this invention to provide novel ionomeric polymer compositions having improved physical properties.

It is a further object of this invention to provide novel ionomeric polymer compositions having improved resistance to tear propagation.

It is a further object of this invention to provide novel ionomeric polymer compositions having improved fire retardance.

It is a further object of this invention to provide novel ionomeric polymer compositions which exhibit decreased water absorption.

It is a further object of this invention to provide novel ionomeric polymer compositions which are thermoplastic and can be readily processed into flexible shaped articles by extrusion or molding of the composition.

It is a further object of this invention to provide novel thermoplastic ionomeric polymer compositions which advantageously utilize a single additive material to provide a variety of improved physical properties, including decreased water absorption, increased fire retardance, and increased resistance to tear propagation.

Other objects of this invention will become apparent from the description appearing hereinafter.

SUMMARY OF THE INVENTION

According to the present invention, it has been discovered that gilsonite can be admixed with ionomeric polymers in a broad range of weight ratios to provide novel ionomeric polymer compositions having increased fire retardance, increased resistance to tear propagation, and decreased water absorption. It has also been found that these improved physical properties can be attained without adverse effect on other physical properties such as tensile strength, elongation at break, and modulus and that, depending on the composition, the incorporation of gilsonite can also improve these latter properties. The compositions of this invention can be formulated as processable materials having suitable rheological properties to permit the fabrication of articles therefrom by extrusion or molding.

The present invention is accordingly directed to novel ionomeric polymer compositions comprising an ionomeric polymer and about 5 to about 125 parts by weight of gilsonite, per 100 parts by weight of the ionomeric polymer. In a preferred embodiment the compositions of this invention comprise a neutralized sulfonated EPDM polymer and about 5 to about 125 parts by weight, preferably about 40 to about 80 parts by weight, of gilsonite per 100 parts by weight of the neutralized sulfonated EPDM.

DETAILED DESCRIPTION OF THE INVENTION

Gilsonite is a commercially available asphaltite mineral which is sometimes referred to as uintaite. It is comprised of at least 50% by weight of asphaltenes and has a nominal melting point in the range of 320° F. to 385° F. A discussion of gilsonite mineral and its properties and uses is provided in Kirk-Othmer, Encyclopedia of Chemical Technology, 3rd Ed., Vol. II, p. 802, which is incorporated herein by reference. In addition to naturally occurring gilsonite, man-made gilsonites have been prepared, e.g., as a flake asphaltene residuum of bituminous solvent extraction processes. The bituminous residuum is chemically similar or essentially identical to the naturally occurring mineral. As used herein, the term "gilsonite" refers to both the naturally occurring mineral and the man-made gilsonites.

The term "ionomeric polymer", as used in the specification and claims, means those polymers which contain pendant ionic groups and can be crosslinked by ionic bonding of these groups. As aforementioned, a matrix of these polymers will contain microphase-separated ionic domains formed as a result of association or aggregation of these ionic groups. To this end, the ionomeric polymers used in this invention contain at least the minimum amount of ionic groups sufficient to permit formation of these ionic aggregates and to have disassociation of the ionic groups cause a marked increase in the fabricability of the material by molding, extrusion, and the like of the polymer. Normally, the ionomeric polymers contain at least about 0.1 mole percent ionic groups, i.e., at least about 1 ionic group per 1000 monomer repeat units, and preferably at least about 1 mole percent. The ionic groups should not be present in amounts which make the polymer substantially water soluble. Such amounts will vary depending on the nature of the polymer backbone and the particular ionic group or groups present. Normally, a satisfactory upper level of ionic group content should be less than about 30 mole percent of the total polymer. The ionomeric polymers are normally prepared by incorporating carboxylic, sulfonic, or phosphonic acid groups into the polymer such as by reacting a suitable base polymer with an acid group producing reactant or by copolymerization of nonionic monomers with ionic group containing monomers.

The acid groups of the polymers are then neutralized with metal or amine ions to ionically link the polymer. The metal ions are normally mono-, di- or trivalent ions of metals of Groups I, II, III, IV-A and VIII of the Periodic Table of Chemical Elements. Suitable monovalent metal cations include sodium, potassium, ammonium, lithium, cesium, silver, mercury, and copper in its monovalent state. Diavalent metal cations which are suitable include ions of berylium, magnesium, calcium, strontium, barium, cadium, copper, mercury, tin, lead, iron, cobalt, nickel, zinc, and the like. Suitable trivalent metal cations include aluminum, iron, and yttrium and the like. The preferred metals, regardless of the nature of the polymer compositions, per se, are zinc and the alkali metals. These metal ions are found to form ionic cross-link groupings which most readily disassociate to impart melt fabricability and the desired improved solid state properties to the ionomeric polymer. More than one metal ion can be employed in the formation of the ionomeric polymers and combinations of metal ions may be preferred under certain applications.

Typical examples of ionomers which contain carboxylate groups therein as a salt in combination with a metal ion are those disclosed in British Pat. No. 1,011,981; U.S. Pat. Nos. 3,264,272; 3,322,734; 3,338,734; 3,355,319; 3,522,222; 3,522,223; and in Kobunshi Kagaku (High Polymer Chemistry), 25, No. 274, pages 107-115 (1968). Typical examples of ionomers employing phosphoynlate-type pendant groups include those disclosed in U.S. Pat. No. 3,094,144; 2,764,563; Soviet Pat. No. 211,079, U.S. Pat. Nos. 3,097,194; 3,255,130; and by J. P. Schroeder and W. P. Sopchak in Journal of Polymer Science, 47, 417-433 (1960). Typical examples of ionomers employing sulfonate-type pendant groups include those disclosed in U.S. Pat. Nos. 2,714,605; 3,072,618; 3,205,285 and 3,836,511. Some of the above references disclose more than one of these three general categories of ionomeric polymers. All of the above references contained within this paragraph are incorporated herein by reference.

Polymers which exhibit both plastic and elastomeric properties, such as styrene-butadiene rubber, butyl rubbers, ethylene-propylene-diene terpolymers and the like which have been sulfonated to convert them into ionomeric polymers are disclosed in U.S. Pat. No. 3,642,728. Polyethers which contain carboxylate, sulfonate or phosphonylate groups suitable for forming into metal salt ionomers are disclosed in U.S. Pat. No. 3,417,036. The teachings contained in these documents are incorporated herein by reference.

The above disclosure clearly indicates that various polymeric materials can be used, and that the polymeric backbone has no practical restrictions other than it containing or being capable of receiving an ionic group of carboxylate, sulfonate or phosphonylate which can be used to form ionomeric cross-linkages. The particular polymer backbone and ionic group will depend upon the particular end use of the polymer composition and can be readily determined by those skilled in this art.

The ionomeric polymers, being re-processable thermoplastic materials which have many of the properties of thermoset polymers at temperatures of use, offer many advantages. However, as previously indicated, certain of these polymers may have a tendency to absorb undue amounts of water and be torn rather easily, particularly where the polymer article has been first cut or punctured. In addition, the ionomeric polymers are generally flammable and tend to propagate flames to an unacceptable degree. In accordance with this invention, it has been found that, surprisingly, the incorporation of gilsonite into ionomeric polymer compositions can significantly improve these and other physical properties of these compositions. Thus, the incorporation of gilsonite into ionomeric polymer compositions can significantly improve the tear propagation resistance and fire retardance of these compositions and decrease the amount of water which they absorb. The degree of improvement which can be attained in these particular properties can significantly enhance the practical utility of these compositions, particularly where the compositions are intended for use as sheets, films, and the like. For example, the improvement in the tear propagation resistance, i.e., the resistance to continued tearing after being initially cut or ruptured, may permit the use of the present compositions as sheets, films, tube walls, and the like in relatively thin cross-sectional dimensions which would otherwise not be practical or acceptable for many uses. Similarly, the improvement in fire retardance may permit the use of the compositions in application areas, e.g., building construction, where they would otherwise be unacceptable. As used herein, the term "fire retardance" means the ability of the composition to retard flame spread once ignited.

The compositions of this invention comprise about 5 to about 125 parts by weight of gilsonite, per 100 parts by weight of the ionomeric polymer. In general, the degree of improvement in tear propagation resistance, fire retardance, and water absorption increases with increasing levels of gilsonite. Generally, it is preferred to employ at least about 20 parts by weight of gilsonite, and most preferably about 40 to 80 parts by weight. Further improvement in the aforementioned physical properties can be obtained by addition of even higher levels of gilsonite in the range of 80 to 125 parts by weight. However, at these higher levels adverse effects on the long term integrity of the composition may occur to an unacceptable extent, particularly where the composition is formed into an article having a high surface area to weight ratio and is exposed to severe weather and environmental conditions. However, if the composition is formed into an article such as a thick block with a low surface area to weight ratio or is not intended for long term exposure to severe environmental conditions these higher gilsonite levels may be satisfactorily employed.

In general, the aforementioned physical property improvements are attained without adverse effect on the tensile strength, elongation at break, and modulus of the ionomeric polymer composition. These properties may even be improved, depending on the composition, and, in general, such improvements will be more pronounced in compositions having relatively high levels of ionomeric polymer and correspondingly lower levels of other ingredients such as fillers, oils and the like.

The compositions of this invention can be formulated as processable, thermoplastic materials which are solid at temperatures of use but readily deformable at elevated temperatures. They can normally be formulated to possess suitable rheological properties to permit processing of the compositions into shaped articles at the normal processing temperatures of conventional ionomeric polymer compositions. Normally, those procedures known in the art for attaining suitable thermoplasticity and rheology in ionomeric polymer compositions can be employed to impart suitable thermoplasticity and rheology to the present compositions. These procedures have generally involved the use of preferential plasticizers which promote the disassociation of the ionic domains in the polymer matrix at elevated temperatures. In addition to the preferential plasticizers disclosed in the previously mentioned U.S. Pat. Nos. 3,847,854 and 3,870,841, preferential plasticizers which may be used herein include the organic ureas and thioureas of U.S. Pat. No. 4,118,359; the aliphatic organic amides of U.S. Pat. No. 4,118,362; the metal rosin salts of U.S. Pat. No. 4,127,546; and the selected non-volatile amines of U.S. Pat. No. 4,131,587. Organic acids neutralized with metal ions are preferred preferential plasticizers for use in this invention, with zinc being the preferred metal and zinc stearate being a particularly preferred plasticizer. The preferential plasticizer can be incorporated into the composition in any suitable amount and generally is present in an amount of about 5 to about 40 parts by weight, per 100 parts by weight of the ionomeric polymer.

The preferred ionomeric polymers for use in this invention are the neutralized sulfonated EPDM terpolymers, hereinafter referred to as SEPDM polymers. SEPDM polymers are elastomeric polymers which are derived by sulfonation of at least some of the olefinic unsaturation sites of elastomeric EPDM base polymers, e.g., in accordance with the methods of U.S. Pat. Nos. 3,642,728 and 3,836,511, both of which are incorporated by reference herein. The $SO_3H$ groups of the sulfonated EPDM are readily neutralized with a basic material to form an ionically cross-linked elastomer having substantially improved physical properties over the unsulfonated elastomer at room temperature.

With regard to the base polymer, the term "EPDM" is used herein in the sense of its definition as found in ASTM-D-1418-64 and is intended to mean a terpolymer containing ethylene and propylene in the backbone and a diene in the side chain. Illustrative methods for producing these polymers are found in U.S. Pat. No. 3,280,082; British Pat. No. 1,030,289 and French Pat. No. 1,386,600. The preferred polymers contain about 45 to about 80 weight percent ethylene and about 2 to about 10 weight percent of a diene monomer, the balance of the polymer being propylene. The diene monomer is preferably a non-conjugated diene. Illustrative of the nonconjugated diene monomers which may be used in the terpolymer EPDM are hexadiene, dicyclopentadiene, ethylidene norbornene, methylene norbornene, propylidene norbornene, and methyl tetrahydroindene.

Typically, the SEPDM polymers, in their acid form, contain about 0.1 to about 20 mole percent $SO_3H$, preferably about 0.5 to about 15 mole percent. The desired amount or range of sulfonation depends on the application and, generally, is that amount or range which allows processing by extrusion or molding at suitable temperatures below the degradation temperature of the polymer. The desired sulfonation limit for such processability will increase as the molecular weight of the polymer decreases. Illustrative in this regard is U.S. Pat. No. 3,642,728 which teaches a preferred upper sulfonation level ($SO_3H$) for olefinically unsaturated polymers of about 3 mole percent for polymers having a number average molecular weight of about 250,000 and an upper limit of about 9 to 14 mole percent for polymers having a number average molecular weight of about 50,000.

The SEPDM polymers may have a number average molecular weight of about 10,000 to about 250,000, more preferably about 15,000 to about 100,000, most preferably about 20,000 to about 60,000. They may be neutralized with any of the metal ions specifically mentioned above but are preferably at least partially neutralized with zinc. It is preferred to utilize SEPDM polymers in which at least 50% of the acid groups are neutralized, more preferably at least 90% of the acid groups. The most preferred SEPDM polymers are those in which 95% to 100% of the acid groups are neutralized, most preferably with zinc.

SEPDM polymers are well known thermoplastic elastomeric ionomers and the preparation, modification, and use of compositions containing SEPDM polymers has been studied extensively. The preferred SEPDM-based compositions of this invention are thermoplastic elastomeric compositions which can be extruded at elevated temperatures into flat, sheet-like configurations such as sheets, tubes, and the like and which, when cooled to ambient temperature, are solid and flexible elastomeric articles. Any of the heretofore known SEPDM polymers and thermoplastic elastomeric compositions containing same can be admixed with gilsonite to prepare these preferred compositions. Consistent with the broad scope of this invention, the gilsonite can be admixed with thermoplastic elastomeric SEPDM compositions in an amount of about 5 to about 125 parts by weight, preferably at least about 20 parts by weight, and more preferably about 40 to about 80 parts by weight, per 100 parts by weight of SEPDM polymer.

In addition to the previously mentioned advantages afforded in the compositions of this invention by the incorporation of gilsonite, the gilsonite provides the further advantage of functioning as an "extender" in the sense that it is a relatively inexpensive material which permits the use of lesser amounts of the more expensive polymer component in a given weight of the composition. Extenders or "fillers" which have been disclosed as additives in SEPDM thermoplastic elastomer compositions, for example, are talcs, calcium carbonate, delaminated, calcined, or hydrated clays, and carbon blacks. Various low asphaltene content asphaltic materials may also be used. In general, increasing amounts of these filler materials tend to decrease the elongation at break (i.e., increase the brittleness) or decrease the tensile strength of the SEPDM composition. Surprisingly, it has been found that these properties are largely unaffected, and may be even be increased, by increasing amounts of gilsonite in SEPDM compositions. This performance may thus be contrasted with that of the previously proposed extenders or fillers for SEPDM compositions and also with that of gilsonite in non-ionomeric polymer compositions where, in general, it tends to decrease tensile strength and elongation at break.

The viscosity of the elastomeric SEPDM-gilsonite compositions of this invention which contain a preferential plasticizer and which are intended for extrusion applications is preferably in the range of about 2000 poise to 5000 poise, as measured at 190° C. on an Instron Capillary Rheometer at a rate of 600 sec$^{-1}$. The viscosity of the composition will depend on the amount and type of SEPDM polymer and preferential plasticizer and on other ingredients present in the compositions. The employment of preferential plasticizers and other viscosity modifying additives to modulate the viscosity of conventional extrudable SEPDM compositions is well known in the art and, in general, these additives can be similarly employed in the present compositions. Suitable viscosities may thus be obtained by relatively simple experimentation which is well within the skill in the art.

The use of preferential plasticizers in the SEPDM compositions of this invention is highly preferred. The organic carboxylic acids having about 5 to about 30 carbon atoms and metal salts thereof are the preferred preferential plasticizers, with zinc stearate being particularly preferred. Preferential plasticizers may be incorporated into the SEPDM-gilsonite composition at up to about 60 parts by weight per 100 parts by weight of the SEPDM, more preferably at about 5 to about 40 parts by weight, and most preferably at about 15 to about 30 parts by weight.

The ionomeric polymer compositions of this invention may contain additional additives such as antioxidants; conventional organic fillers, e.g., carbon black; conventional inorganic fillers, e.g., calcium carbonate, calcined clays, hydrated clays, talc, and the like; waxes; processing oils; and polymers other than ionomeric elastomers, e.g. polyethylene or polypropylene.

The compositions of this invention can be prepared by blending an ionomeric polymer, gilsonite, and any other additives intended for incorporation into the composition, including any preferential plasticizer if not already contained in the polymer sample. Blending may be accomplished by mixing the materials at ambient temperature and heating the mix to temperatures above the softening point of the gilsonite, prefebably in the range of 350°–375° F. to form a melt. Sufficient agitation is provided to the melt to form a uniform mixture. The melt may be heated and mixed in conventional compounding equipment such as a Banbury Mixer, Farrel Continuous Mixer, Haake Mixer, or twin screw extruder. Mixing times of one to ten minutes at 350°–375° F. are generally sufficient for obtaining an essentially homogenous blend.

The present invention is further described by the following Examples which are illustrative only and not intended to be of limiting effect. In the following Examples, all parts and percentages are by weight unless otherwise specified.

EXAMPLE 1

A dry powder mixture was prepared by mixing, at room temperature, 100 parts of an SEPDM polymer, 15 parts of zinc stearate, 30 parts of carbon black ("N-550", available from Cabot Corp., Boston, Mass.), 0.5 parts of the antioxidant Irganox 1010 (available for Ciba Geigy Corp.) and 25 parts of pulverized gilsonite ("American Gilsonite Selects" grade) obtained from American Gilsonite Company, Salt Lake City, Utah. The SEPDM polymer comprised, as the diene monomer, 5-ethylidene-2-norbornene and had an average molecular weight of about 50,000, an average degree of sulfonation of 13 $SO^-_3$ groups per molecule, and 100% of the sulfonate groups neutralized with zinc. The gilsonite had a softening point of about 320° F.

The powder mixture was placed in a Haake intensive mixer and heated and mixed at a temperature of about 350° F. for about 5 minutes. A smooth, black melt was obtained.

Approximately 50 gram samples of the melt were placed in a press in which both platens were heated to a temperature of about 350° F. and the melt samples were compressed into sheets which were flexible when cooled to room temperature and had an approximate thickness of 22 mils.

Three additional compositions were identically prepared and pressed into sheets except that the gilsonite levels were adjusted to 0, 50, and 75 parts.

The sheet samples of each composition were tested for tear propagation resistance, tensile strength, elongation at break, and modulus. Two series of measurements were carried out, one series being made on "dry" sheet samples which were conditioned in a convection oven at 120° F. for 24 hours prior to testing and a second series being made on "wet" sheet samples which were immersed in water at 120° F. for seven days prior to testing. The amount of water absorbed by the wet samples as a percentage of the weight of the sheet was also calculated by measurement of the weight of the sheet before and after immersion.

Tear propagation resistance was measured on 1×3 inch samples in accordance with ASTM D1938-67 using an Instron Model 1000 instrument. Five sheet samples of each composition were tested and the results averaged. The averaged values, given in Table I in pounds, indicate the average force necessary to propagate a tear across the pre-slit sheet. Tensile strength, modulus, and elongation at break were measured at ambient temperature in accordance with ASTM D638-82 on ⅛×4 inch rectangular samples, also with the Instron Model 1000. The jaw gap was two inches and the samples were pulled at rate of 2 inches per minute. Again, five sheet samples of each composition were tested and the results averaged. These average values and the water absorption of the wet sheets are provided in Table II.

TABLE 1

| Sample | Gilsonite Level | Tear Resistance (lbs) | |
|---|---|---|---|
| | | Dry | Wet |
| Reference | 0 | 0.35 | 0.8 |
| 1-A | 25 | 0.61 | 1.9 |

TABLE 1-continued

| Sample | Gilsonite Level | Tear Resistance (lbs) Dry | Wet |
|---|---|---|---|
| 1-B | 50 | 1.06 | 4.0 |
| 1-C | 75 | 1.44 | 5.5 |

TABLE II

| Sample | Gilsonite Level | Dry Samples[1] | | | Wet Samples[2] | | | |
|---|---|---|---|---|---|---|---|---|
| | | Tensile Strength (psi) | Elongation* (%) | 100% Modulus (psi) | Tensile Strength (psi) | Elongation (%) | 100% Modulus (psi) | % Water Absorbed |
| Reference | 0 | 2469 | 396 | 860 | 2380 | 582 | 488 | 2.64 |
| 1-A | 25 | 2030 | 405 | 863 | 2071 | 607 | 554 | 2.28 |
| 1-B | 50 | 2630 | 574 | 926 | 2548 | 685 | 675 | 1.93 |
| 1-C | 75 | 2720 | 625 | 954 | 2482 | 690 | 765 | 1.62 |

*Elongation at break
[1]Samples placed in an oven at 120° F. for 24 hours prior to testing
[2]Samples immersed in water at 120° F. for 7 days prior to testing The results of Table I show a significant increase in tear propagation resistance with increasing gilsonite content, with proportionately greater increases in the wet sample.

The results of Table II show improvements in elongation at break, 100% modulus, and water absorption with increasing gilsonite content and show a relatively slight effect of the gilsonite on tensile strength, with some improvement being seen at the higher gilsonite levels.

EXAMPLE 2

100 parts of the SEPDM polymer of Example 1, 20 parts of zinc stearate, 1.5 parts of Irganox 1010, 75 parts N-550 carbon black, 75 parts of a paraffinic oil (Sunpar 2280, available from Sun Oil Company), 10 parts of high density polyethylene and varying amounts of gilsonite were blended and pressed into sheets as in Example 1. The sheets were about 20 to 22 mils thick. The gilsonite was incorporated at levels of 0, 15, 25, 35, and 45 parts.

Tensile strength, elongation at break, 100% modulus and tear propagation resistance were determined as in Example 1 on sheet samples conditioned at 120° F. for 24 hours. The results are shown in Table III.

TABLE III

| Sample | Gilsonite Level | Tear Propagation Resistance (lbs.) | Tensile Strength (psi) | Elongation (%) | 100% Modulus (psi) |
|---|---|---|---|---|---|
| 2A | 0 | 1.38 | 1738.5 | 771 | 421.3 |
| 2B | 15 | 1.90 | 1586.7 | 752 | 437.3 |
| 2C | 25 | 1.92 | 1775.4 | 824 | 475.0 |
| 2D | 35 | 1.64[3] | 1635.6 | 736 | 489.5 |
| 2E | 45 | 2.18 | 1680.3 | 792 | 495.3 |

[3]Average sheet thickness (5 samples) was about 18 mils.

EXAMPLE 3

Compositions were prepared which were identical to those of Example 2 except that the compositions of this Example also contained 3 parts of distearylthiodipropionate (available from the Carstab Corp.) and the gilsonite levels were 0, 10, 25, 50, and 75 parts. Tensile properties and tear propagation resistance were determined as in Example 1 on sheet samples conditioned in a convection oven at 120° F. for 24 hours and are provided in Table IV.

TABLE IV

| Sample | Gilsonite Level | Tear Propagation Resistance (lbs.) | Tensile Strength (psi) | Elongation (%) | 100% Modulus (psi) |
|---|---|---|---|---|---|
| Reference | 0 | 1.52 | 508.4 | 655 | 473.9 |
| 3-A | 10 | 1.60 | 1597.2 | 741 | 471.7 |
| 3-B | 25 | 1.84 | 1380.8 | 648 | 488.0 |
| 3-C | 50 | 2.16 | 1492.0 | 752 | 484.0 |
| 3-D | 75 | 2.40 | 1316.8 | 659 | 484.6 |

The fire resistance of the reference and sheet samples of compositions 3A-D was measured by flame spread tests conducted on 10 in. × 14 in. sheet samples which had been previously conditioned in a convection oven at 120° F. for 24 hour. The tests were conducted by mechanically attaching the sheet sample to a 2 inch thick isocyanurate block substrate inclined at ¼ inch per foot to horizontal, directing a flame at the lower portion of the membrane for a set period of time (10 minutes maximum) and measuring the upward progress or spread of the flame, i.e., the upward burning of the sample. The flame was provided by a blast type bunsen burner with a 4 inch wide L-shaped top having a ⅛ inch slit along its top edge. The burner was centrally positioned adjacent the lower 10 inch edge of the sheet sample. Flame temperature was 1350° F.±50° F. Air flowing at a velocity of about 7-8 miles per hour was used to better direct the flame at and over the sample and was provided by means of a small fan and air flow tunnel.

Flame spread measurements after specified periods of time ("Burn Time") are provided in Table V.

TABLE V

| Sample | Flame Spread (in.) | Burn Time (min.) |
|---|---|---|
| Reference | 14 | 10 |
| | 8 | 10 |
| 3-A | 14 | 7 |
| | 11¼ | 10 |
| 3-B | 14 | 8 |
| | 5¼ | 10 |
| 3-C | 4¼ | 10 |
| | 4¼ | 10 |
| 3-D | 3¼ | 10 |
| | 4⅛ | 10 |

EXAMPLE 4

The compositions of this invention may be compared with similar compositions containing asphaltic materials other than gilsonite. In this Example, compositions were prepared which were identical to those of Example 3 except that a standard grade 150 asphalt (150° F. softening point) was substituted for the gilsonite. Sheet materials were prepared and conditioned as in Example 3 and the fire resistance of these sheets was evaluated as above. A comparison of the results with those of Example 3 is provided in Table VI. The results of Table VI show that gilsonite provides superior fire resistance while virtually no improvement is observed in the 150 asphalt containing samples.

TABLE VI

| Sample | Flame Spread (in.) | Burn Time (Min.) |
|---|---|---|
| Reference | 14 | 8 |
|  | 14 | 10 |
| 3-A | 14 | 7 |
|  | 11¼ | 10 |
| 4-A | 14 | 9 |
|  | 14 | 9 |
| 3-B | 14 | 8 |
|  | 5⅜ | 10 |
| 4-B | 14 | 6 |
|  | 12¼ | 10 |
| 3-C | 4¼ | 10 |
|  | 4½ | 10 |
| 4-C | 14 | 9 |
|  | 11⅜ | 10 |
| 3-D | 3⅞ | 10 |
|  | 4⅞ | 10 |
| 4-D | 14 | 10 |
|  | 14 | 7 |

EXAMPLE 5

In this Example, the affect of gilsonite on the elongation at break of SEPDM compositions is compared with that of N-550 carbon black. N-550 is a commonly used filler or extender for SEPDM formulations.

Compositions were prepared as in Example 1 containing 100 parts of the SEPDM polymer of Example 1, 1.5 parts Irganox 1010, 20 parts zinc stearate, 10 parts of Vestowax FT-150 (a microcrystalline wax available from Dura Commodities Corp., Harrison, N.Y.), 15 parts of high density polyethylene, 65 parts of Sunpar 2280, and varying amounts of gilsonite and N-550. Table VII provides the gilsonite and N-550 amounts and shows the affect on elongation of these materials. The results of Table VII show that the elongation is largely unchanged by increasing gilsonite with N-550 content held constant while it is substantially decreased, i.e., the brittleness of the sample is substantially increased, with increasing N-550 content with the gilsonite level held constant.

TABLE VII

| Sample | N-550 Level | Gilsonite Level | Elongation (%) |
|---|---|---|---|
| 5-A | 65 | 5 | 531 |
| 5-B | 65 | 65 | 577 |
| 5-C | 65 | 125 | 563 |
| 5-D | 5 | 65 | 837 |
| 5-E | 125 | 65 | 161 |

What is claimed is:

1. A composition comprising an ionomeric polymer and about 5 to about 125 parts by weight of gilsonite, per 100 parts by weight of said polymer.

2. A composition of claim 1 comprising at least about 20 parts by weight of gilsonite.

3. A composition of claim 1 comprising about 40 to about 80 parts by weight of gilsonite.

4. A composition of claim 1 further comprising a plasticizer which plasticizes the ionic cross-link regions of said polymer.

5. A composition of claim 4 wherein said plasticizer is present in an amount of about 5 to about 40 parts by weight, per 100 parts by weight of said polymer.

6. A composition of claim 4 wherein said plasticizer is a metal ion neutralized organic acid.

7. A composition of claim 6 wherein said plasticizer is zinc stearate.

8. A composition of claim 1 wherein said ionomeric polymer comprises at least about 1 mole percent of ionic groups selected from carboxylate, sulfonate, and phosphonylate.

9. A composition of claim 8 wherein at least 90% of said ionic groups are neutralized with a metal ion capable of ionically cross-linking said polymer.

10. A composition of claim 9 wherein said metal ion is selected from the group consisting of zinc ion and the alkali metal ions.

11. A composition of claim 8 wherein said ionomeric polymer is a sulfonated styrene-butadiene rubber, sulfonated butyl rubber, or sulfonated ethylene-propylene-diene terpolymer.

12. A flexible sheet comprising the composition of claim 1.

13. A flexible sheet prepared by pressing or extruding the composition of claim 1.

14. A thermoplastic elastomeric composition comprising a neutralized sulfonated ethylene-propylene-diene terpolymer and about 5 to about 125 parts by weight of gilsonite, per 100 parts by weight of said terpolymer.

15. A composition of claim 14 wherein said terpolymer comprises about 0.1 to about 20 mole percent sulfonate groups.

16. A composition of claim 15 wherein at least 90% of the sulfonate groups of said terpolymer are neutralized.

17. A composition of claim 16 wherein about 95% to 100% of the sulfonate groups of said terpolymer are neutralized with zinc.

18. A composition of claim 14 comprising at least about 20 parts by weight of gilsonite.

19. A composition of claim 14 comprising about 40 to about 80 parts by weight of gilsonite.

20. A composition of claim 14 comprising a preferential plasticizer which plasticizes the ionic cross-link regions of said polymer.

21. A composition of claim 20 wherein said preferential plasticizer is selected from the group consisting of organic carboxylic acids having about 5 to about 30 carbon atoms and metal salts thereof.

22. A composition of claim 21 comprising about 10 to about 40 parts by weight of said preferential plasticizer, per 100 parts by weight of said terpolymer.

23. A composition of claim 22 wherein said plasticizer is zinc stearate.

24. A composition of claim 23 in which about 95 to 100 percent of the sulfonate groups of said terpolymer are neutralized with zinc.

25. A thermoplastic elastomeric composition comprising an ionically cross-linked neutralized sulfonated ethylene-propylene-diene terpolymer, about 20 to about 125 parts by weight of gilsonite, per 100 parts by weight of said terpolymer, and about 10 to about 40 parts by weight of zinc stearate, per 100 parts by weight of said terpolymer, said terpolymer comprising at least about 1 mole percent sulfonate groups and having about 95% to 100% of said sulfonate groups neutralized with zinc.

* * * * *